(12) United States Patent
Mukkala et al.

(10) Patent No.: US 8,303,465 B2
(45) Date of Patent: Nov. 6, 2012

(54) METHOD FOR CONTROLLING ENGINE TEMPERATURE OF AN ENGINE

(75) Inventors: Benjamin Carl Mukkala, Ann Arbor, MI (US); Nathanael David Shaw, Brighton, MI (US); Jason Eugene Devries, Belleville, MI (US); Brian Michael O'Neil, Ann Arbor, MI (US); Michael Joseph Guinta, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 526 days.

(21) Appl. No.: 12/609,456

(22) Filed: Oct. 30, 2009

(65) Prior Publication Data

US 2011/0100340 A1   May 5, 2011

(51) Int. Cl.
*F02D 23/00* (2006.01)
*F01P 7/02* (2006.01)

(52) U.S. Cl. ........................... 477/33; 123/41.13
(58) Field of Classification Search ............. 123/41.13, 123/403, 406, 564, 316, 41.316, 41.02; 477/33
See application file for complete search history.

(56) References Cited

U.S. PATENT DOCUMENTS

| | | | | |
|---|---|---|---|---|
| 6,055,947 | A * | 5/2000 | Okuno | 123/41.13 |
| 6,571,765 | B2 * | 6/2003 | Kuboshima et al. | 123/305 |
| 6,739,290 | B2 * | 5/2004 | Iwasaki et al. | 123/41.05 |
| 6,880,495 | B2 * | 4/2005 | Le Lievre et al. | 123/41.1 |
| 8,215,292 | B2 * | 7/2012 | Bryant | 123/559.1 |

* cited by examiner

*Primary Examiner* — Dirk Wright
(74) *Attorney, Agent, or Firm* — Julia Voutyras; Alleman Hall McCoy Russell & Tuttle LLP

(57) ABSTRACT

A method for controlling engine temperature of an engine with a wide dynamic range is disclosed. In one example, the derivative of an engine temperature is assessed by a controller. The controller may adjust engine actuators to limit engine temperature in response to the derivative.

14 Claims, 4 Drawing Sheets

METHOD FOR CONTROLLING ENGINE TEMPERATURE OF AN ENGINE

TECHNICAL FIELD

The present application relates to the field of automotive engine temperature control systems and methods.

BACKGROUND AND SUMMARY

Recently, engine fuel economy has been improved by reducing engine displacement and increasing the dynamic range of engines. In particular, smaller engines have been boosted to provide the performance of larger less efficient engines while increasing fuel economy by way of lower engine pumping losses. Further, by directly injecting fuel into a boosted engine, engine performance can be further improved since direct injection of fuel helps to cool the incoming charge, thereby allowing additional air into engine cylinders. However, boosting and directly injecting fuel to cylinders can also cause engine temperature to rise at a rate that is higher than that of conventionally aspirated engines. In particular, cylinder temperatures may rise quickly and impart additional heat to the vehicle cooling system since more charge is inducted to cylinders and since downsized engines may have fewer cylinders. And, since the engine temperature may have a rate of rise that is higher than that of normally aspirated port fuel injected engines, it may be more difficult to keep engine temperatures below a desired level when a torque request is made. Thus, increased engine performance and fuel economy may be achieved, but the increased engine performance may subject the engine to the possibility of operating above a desired temperature.

The inventors herein have developed a method for providing engine performance and fuel economy while at the same time reducing the possibility of heating an engine to a temperature that is greater than a desired temperature. In particular, the inventors have developed a method for controlling an engine, comprising: when engine temperature is less than a first threshold, limiting an engine temperature rate of change to be less than a first amount; and when said engine temperature exceeds the first threshold, limiting the engine temperature rate of change to be less than a second amount, said second amount less than said first amount.

The performance of an engine having a wide dynamic operating range may be preserved while the possibility of operating the engine above a desired temperature is reduced by controlling the engine in relation to engine temperature and the rate of engine temperature change. For example, when an engine is operating at a low load and the engine cooling system has excess cooling capacity, the engine may be operated at full load for intervals without limiting engine load capacity or power output. On the other hand, when the engine is operating at higher loads for an extended period of time, the engine load capacity or power output may be lowered to a level that is less than full engine power during periods when full engine power is requested. In addition, to further improve engine temperature control, the reduction of engine power output during higher engine temperature conditions can be related to (e.g., proportional to) the rate of change in engine temperature. In this way, engine power output can be controlled so that there is less possibility of operating the engine above a desired temperature when engine torque is requested.

The present description may provide several advantages. For example, the approach may reduce the possibility of engine degradation while the engine provides a desired level of performance. Further, the approach may allow an engine manufacturer to provide adequate engine cooling without having to oversize the engine cooling system. Further still, the approach can provide full power output when the cooling system has excess cooling capacity. In addition, the approach can also limit engine power output when the engine cooling system is operating at a higher utilization amount.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DEPICTED EMBODIMENTS

Figure 1:
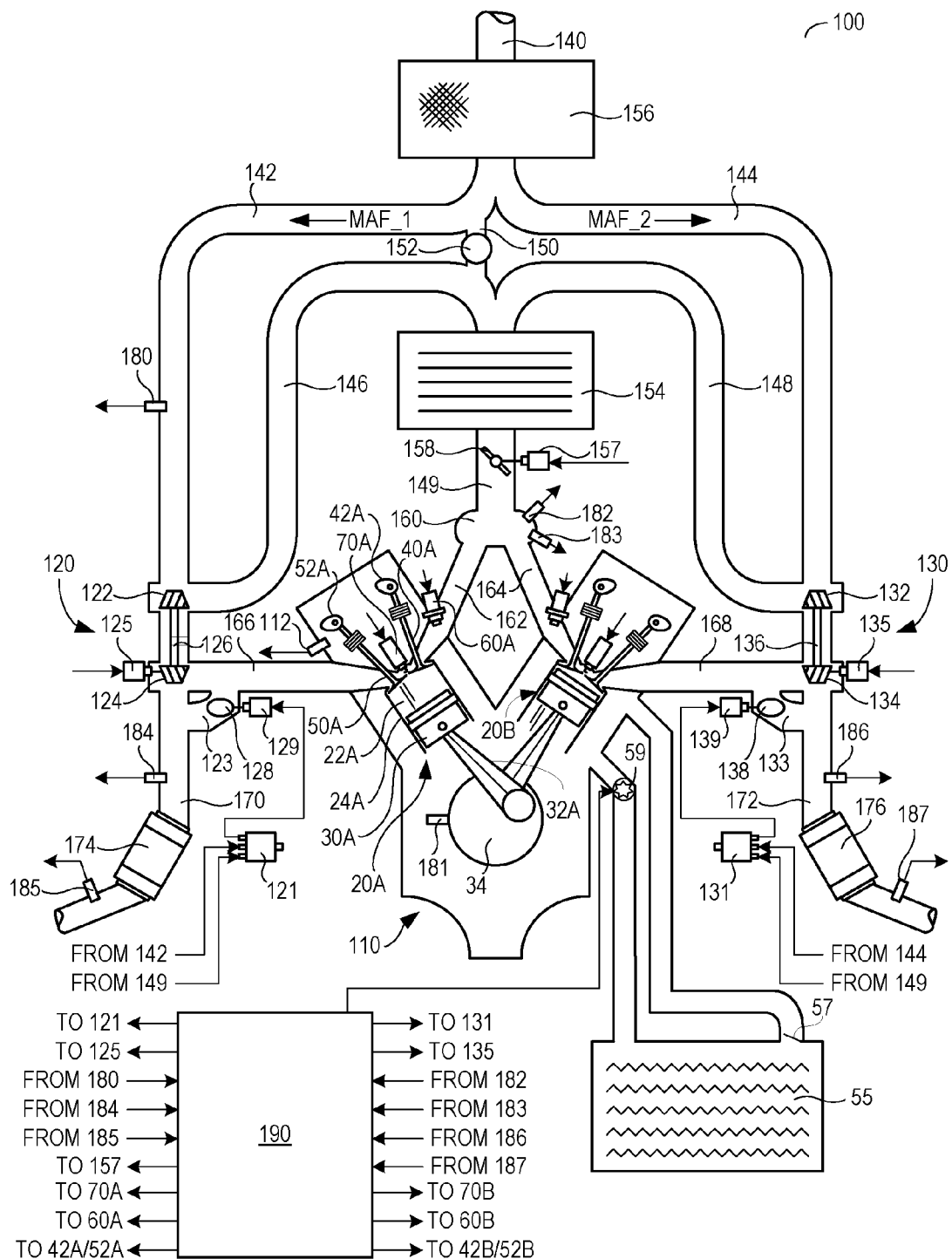
FIG. 1 shows a schematic view of an exemplary embodiment of a turbocharged gasoline direct injection engine.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 110 may include a plurality of cylinders two of which are shown in FIG. 1 as 20A and 20B. Note that in some examples, engine 110 can include more than two cylinders such as 4, 5, 6, 8, 10 or more cylinders. These various cylinders can be equally divided and arranged in a vee configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. As one non-limiting example, control system 190 can adjust the position of actuator 129 via a solenoid valve 121. In this particular example, solenoid valve 121 receives a pressure difference for facilitating the actuation of wastegate 128 via actuator 129 from the difference in air pressures between intake passage 142 arranged upstream of compressor 122 and intake passage 149 arranged downstream of compressor 122. As indicated by FIG. 1, control system 190 communicates with actuator 129 via solenoid valve 121. However, it should be appreciated in other examples other suitable approaches for actuating wastegate 128 may be used.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. The position of wastegate 138 may be controlled by actuator 139 as directed by control system 190. As one non-limiting example, control system 190 can adjust the position of actuator 139 via a solenoid valve 131. In this particular example, solenoid valve 131 receives a pressure difference for facilitating the actuation of wastegate 138 via actuator 139 from the difference in air pressures between intake passage 144 arranged upstream of compressor 132 and intake passage 149 arranged downstream of compressor 132. As indicated by FIG. 1, control system 190 communicates with actuator 139 via solenoid valve 131. However, it should be appreciated that in other examples other suitable approaches for actuating wastegate 138 may be used.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Coolant pump 59 pressurizes engine coolant from engine system 100 to radiator 55. Coolant pump 59 may be mechanically or electrically driven. In one embodiment, an electrically driven coolant pump is activated and deactivating by control system 190 in response to engine operating conditions. Coolant that has been warmed by engine system 100 is cooled as it passes through radiator 55. Thermostat 57 regulates the flow of coolant from radiator 55 to engine system 100. Thermostat 57 may be controlled by a wax pellet or electronically by controller 190. Thermostat 57 opens to let cooled engine coolant into engine system 100. Engine coolant temperature may be determined from engine coolant temperature sensor 112.

Engine system 100 can include various other sensors. For example, at least one of intake passages 142 and 144 can include a mass air flow sensor 180. In some examples, only of intake passages 142 and 144 can include a mass air flow sensor. In still other examples, both of intake passages 142 and 144 can include a mass airflow sensor. A mass airflow sensor may include, as one example, a hot wire anemometer or other suitable device for measuring mass flowrate of the intake air. Mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, throttle angle, valve timing, and fuel injection timing can be actuated by the control system.

Figure 2:
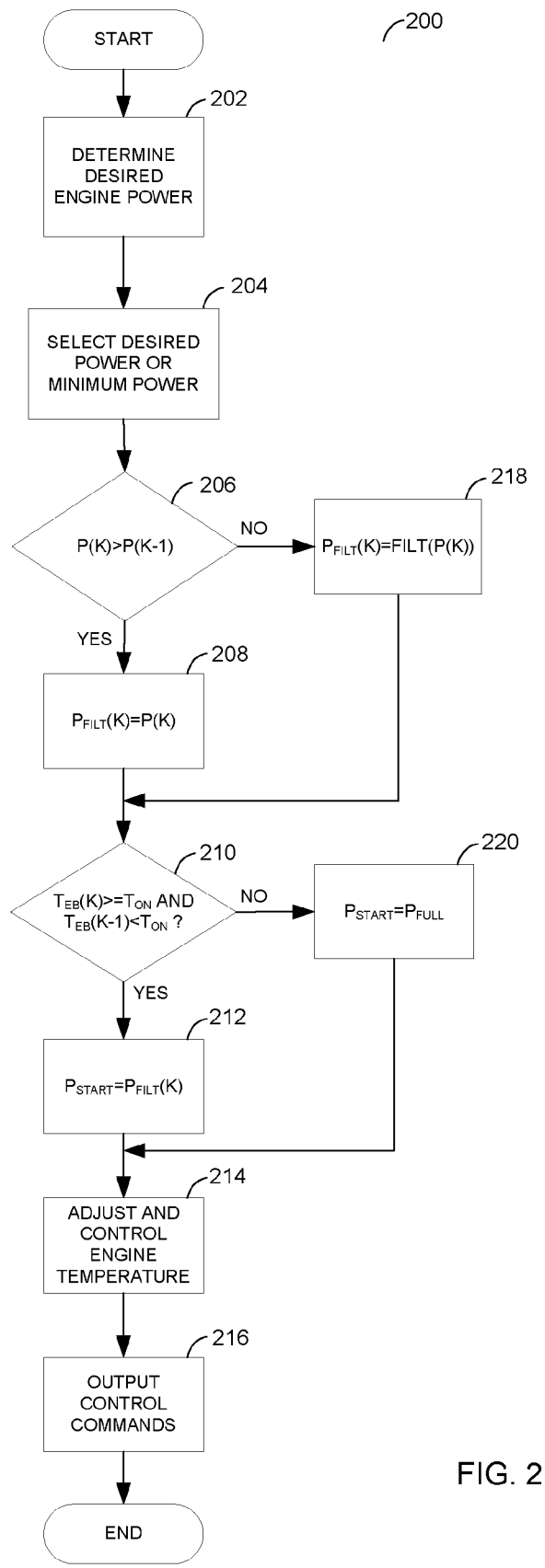
FIG. 2 shows a flow chart of a method to control engine temperature.

Referring now to FIG. 2, a flow chart of routine 200 to control engine temperature is shown. At 202, desired engine power is determined. In one embodiment, the current or present engine speed and desired torque are multiplied to yield a desired engine power. The desired engine torque may be determined from summing estimated engine friction losses, engine pumping losses, and engine brake torque. The engine speed may be determined from engine speed sensor 181 of FIG. 1. After desired engine power is determined routine 200 proceeds to 204.

At 204, routine selects the higher value of either the desired engine power or a predetermined power level $P_{START\_MIN}$ and places the result in variable $P_{INIT}(K)$. By selecting the higher of the two terms, the controller described below can limit engine power to a level even though the desired power may be less than $P_{START\_MIN}$.

Routine 200 then proceeds to 206. At 206, routine 200 evaluates whether or not the current sampled desired engine power is greater than the previously sampled desired engine power. Specifically, if $P_{INIT}(K) > P_{INIT}(K-1)$ then routine 200 proceeds to 208, otherwise routine 200 proceeds to 218. If the current sampled desired engine power is greater than previously sampled desired engine power, routine 200 proceeds to 208 where a filtered engine power variable $P_{FILT}$ is populated with the current sampled desired engine power. Otherwise, the desired engine power is processed through a low pass filter at 218 updating the filtered engine power variable $P_{FILT}$ and then routine 200 proceeds to 210.

At 210, routine 200 compares a present sampled engine temperature ($T_{EB}$) with a threshold temperature at which engine temperature is controlled in response to a rate of engine temperature ($T_{ON}$). In one embodiment, engine temperature may be a temperature of an engine block, a temperature of a cylinder head, or a temperature of another engine component. Routine 200 determines if a sample of present engine temperature is greater than or equal to a threshold temperature at which it is desirable to control engine temperature in response to a rate of change of engine temperature. In addition, at 210 routine 200 determines if a previous sample of engine temperature (e.g., one engine temperature sample before the present engine temperature sample) is less than a temperature threshold at which it is desirable to control engine temperature in response to a rate of change of engine temperature. If the present sample of engine temperature is greater than or equal to the threshold temperature and if the previous sample of engine temperature is less than the threshold temperature, routine 200 proceeds to 212. Otherwise, routine 200 proceeds to 220. At 220, routine 200 sets control variable $P_{START}$ to a value that represents full engine power ($P_{FULL}$). At 212, routine 200 sets control variable $P_{START}$ equal to $P_{FILT}$. $P_{START}$ represents the engine power that is available at the start of engine temperature regulation. Thus, routine 200 can vary $P_{START}$ between a power level at which an engine temperature exceeded a threshold temperature at which engine temperature is controlled in response to a rate of engine temperature ($T_{ON}$) and a predetermined threshold power level that represents the extent to which engine power may be limited ($P_{MINLMT}$).

At 214, routine 200 provides a controller that integrates the error between a limited rate of engine temperature rise ($T'_{LMT}$) and the actual rate of engine temperature rise ($T'_{EB}$) to adjust engine power, thereby limiting engine temperature. The limited rate of engine temperature rise may be determined from a function or table that is indexed by the actual present engine temperature. In one embodiment, in response to the actual present engine temperature, the limited rate of engine temperature rise function outputs an engine temperature rate of change limit that is desired at the present engine temperature. For example, at an engine temperature of 50° C. the rate of allowed engine temperature rise may be 15° C./min while the rate of allowed engine temperature rise at an engine temperature of 100° C. is limited to 2° C./min.

The output of the table that limits the rate of engine temperature rise ($T'_{LMT}$) may include hysteresis for determining the limited rate of engine temperature rise. For example, if the engine is operating at a first engine temperature ($T_{EB}$) that is below the a threshold temperature at which engine temperature is controlled in response to a rate of engine temperature ($T_{ON}$), the limited rate of engine temperature rise may be a first value that is higher than other values such that engine temperature may rise ($T'_{LMT}$) relatively quickly. If the engine temperature ($T_{EB}$) rises to a second engine temperature that is higher than the first engine temperature, a temperature that is above the threshold temperature at which engine temperature is controlled in response to a rate of engine temperature ($T_{ON}$), the limited rate of engine temperature rise ($T'_{LMT}$) may be adjusted to a second value that is less than the first value. The limited rate of engine temperature rise may be held or somewhat reduced, but still active at the second value, until engine temperature falls to a value that is less than a threshold temperature at which engine temperature is controlled in response to a rate of increase of engine temperature. In this way, it is possible for engine temperature to vary about the threshold temperature at which engine temperature is controlled in response to a rate of increase of engine temperature without repeatedly activating and deactivating the controller.

The output of the table that limits the rate of engine temperature rise ($T'_{LMT}$) may also be calibrated such that when the sampled actual engine temperature ($T_{EB}$) is less than a threshold temperature at which engine temperature is controlled in response to a rate of engine temperature ($T_{ON}$) then the limited rate of engine temperature rise ($T'_{LMT}$) may be higher than the actual rate of engine temperature rise ($T'_{EB}$).

The output of the table that limits the rate of engine temperature rise ($T'_{LMT}$) may also be calibrated such that when the sampled actual engine temperature ($T_{EB}$) is equal to a threshold temperature at which engine temperature is controlled in response to a rate of engine temperature ($T_{ON}$) then the rate of engine temperature rise ($T'_{LMT}$) may be zero.

The output of the table that limits the rate of engine temperature rise ($T'_{LMT}$) may also be calibrated such that when the sampled actual engine temperature ($T_{EB}$) is greater than a threshold temperature at which engine temperature is controlled in response to a rate of engine temperature ($T_{ON}$) then the rate of engine temperature rise limit ($T'_{LMT}$) may be lower than the actual rate of engine temperature rise ($T'_{EB}$). In this way, the controller can lower available engine torque up to a threshold for controlling engine temperature.

At 214, routine 200 also subtracts the actual rate of engine temperature rise ($T'_{EB}$) from the rate of engine temperature rise limit ($T'_{LMT}$) to produce an error term $T'_{ERROR}$. Further, routine 200 integrates $T'_{ERROR}$ and adds it to $P_{START}$ to provide an engine power limit $P_{LIMIT}$ to which engine power is restricted in response to the rate of engine temperature rise and a present engine temperature.

Thus, if the engine temperature is less than a threshold temperature at which engine temperature is controlled in response to a rate of engine temperature ($T_{ON}$), then routine 200 controls to limit engine power to a level of $P_{START}$ or greater since adding $P_{START}$ to the integrated value of $T'$ ERROR when the engine is operating at a temperature less than $T_{ON}$ may act to increase $P_{LIMIT}$ to a value greater than $P_{START}$. On the other hand, if engine temperature is greater than a threshold temperature at which engine temperature is controlled in response to a rate of engine temperature ($T_{ON}$), then routine 200 controls the limit of engine power to a level of $P_{START}$ or less since adding $P_{START}$ to the integrated value of $T'_{ERROR}$ when the engine is operating at a temperature greater than $T_{ON}$ may act to decrease $P_{LIMIT}$ to a value less than $P_{START}$.

Next at 214, the engine power limit $P_{LIMIT}$ is divided by the present engine speed to produce a limited torque ($T_{LIMIT}$). Then, routine 200 compares desired torque $T_{DESIRED}$ to limit torque $T_{LIMIT}$ and selects the lesser of the two values. By selecting the lesser value, routine 200 allows desired engine torque to be delivered by the engine unless the desired torque exceeds a level that will increase engine temperature at a level that is greater than desired.

Thus, the controller of routine 200 can operate an engine such that a rate of temperature change of said engine is less than a first amount during a first operating condition, and during a second operating condition, operate the engine such that said rate of temperature change of the engine is less than or equal to a second amount when an engine temperature exceeds a first threshold, the second amount less than said first amount. Further, routine 200 can adjust the rate of engine temperature rise by adjusting the engine air-fuel rich, by adjusting engine boost by way of a waste gate or vane position, adjusting spark timing by controlling the spark angle which spark is supplied to at least one cylinder of the engine, adjusting the position of a throttle valve plate, or by adjusting valve timing (e.g., by retarding or advancing valve timing, or by reducing valve lift).

In addition, routine 200 can limit automatic transmission downshifting when the calculated resultant engine speed after the downshift would be above a threshold speed. For example, a downshift from third gear to second gear can be inhibited when engine load increases from a first engine load to a second engine load, the second engine load greater than the first engine load and engine speed is above 2400 RPM. On the other hand, routine 200 can permit an automatic transmission downshift when engine load decreases from a first engine load to a second engine load, the second engine load less than the first engine load when engine speed is less than 1200 RPM, for example. In this way, routine 200 can control engine temperature by inhibiting transmission downshifting so that engine speed is controlled.

Further, routine 200 may regulate engine temperature by adjusting an engine control parameter such that a rate of temperature change of said engine is less that a first amount when a temperature of said engine is less than a first threshold temperature. Routine 200 may also adjusting an engine control parameter such that the rate of temperature change of said engine is less than a second amount, the second amount less than said first amount, when a temperature of the engine is greater than a second threshold temperature.

In an alternative embodiment, a proportional/integral/derivative controller may be provided that limits engine power when engine temperature approaches a threshold level. For example, actual engine temperature can be subtracted from desired engine temperature to produce a temperature error value. The temperature error value may be integrated and multiplied by an integral gain term $K_I$ and added to a proportional term that is multiplied by a gain term $K_P$ and added to a derivative term that is multiplied by a gain term $K_D$. Further, the gain terms $K_P$, $K_I$, and $K_D$ may be functions that vary with operating conditions. For example, the proportional gain $K_P$ may have a first gain when engine temperature error is less than a threshold amount, and $K_P$ may have a second higher gain when engine temperature is greater than a threshold amount. In this way, the proportional gain may be non-linear such that engine power is more significantly reduced when engine temperature exceeds a threshold by a predetermined or calibratible amount. Likewise, integral and derivative gains may be similarly defined. The output of the PID controller can then be added to or subtracted from the desired engine power, thereby limiting the engine power when engine temperature approaches a threshold value ($P_{LIMIT}$). The modified engine power request can be divided by the present engine speed to produce a limited torque ($T_{LIMIT}$). Then, desired torque $T_{DESIRED}$ may be compared to $T_{LIMIT}$ and the lower of the two values may be selected. Routine 200 moves from 214 to 216 after providing an engine torque request $T_{REQUEST}$.

Figure 3:
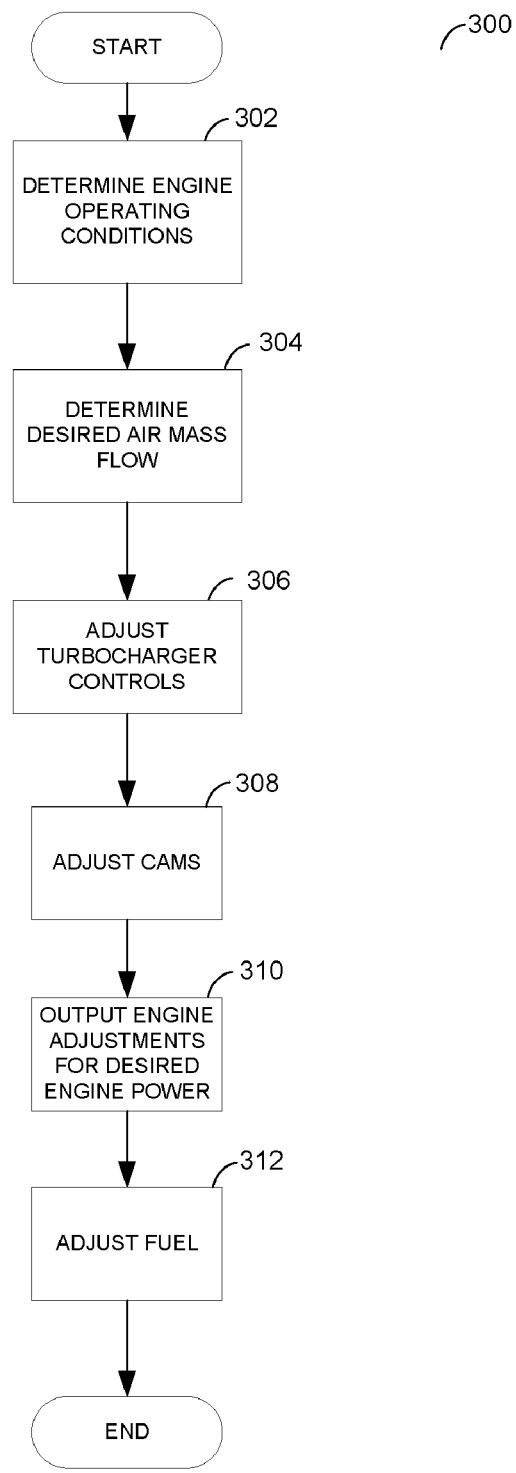
FIG. 3 shows a flow chart of a flow control routine for adjusting cylinder air flow.

At 216, routine 200 outputs the desired engine torque request by adjusting engine actuators. The method of FIG. 3 is one way of outputting the desired engine power at 216, though other methods and variations are anticipated. After outputting the requested power, routine 200 exits.

Referring now to FIG. 3 a flow chart of routine 300 for adjusting engine actuators for a desired engine torque is shown.

At 302, routine 300 determines engine operating conditions. Engine operating conditions can be determined and/or monitored by sampling data from various vehicle and/or engine sensors shown, but not limited to those illustrated in FIG. 1. For example, engine temperature can be determined by sampling the output of the engine coolant temperature sensor 112 that is shown in FIG. 1. In addition, engine operating conditions can include, but are not limited to the pressure in the engine intake manifold, the air temperature in the engine intake manifold, the pressure in the engine exhaust manifolds, the temperature in the engine exhaust manifolds, the state of an engine exhaust gas oxygen sensors, the engine torque request, engine speed, and barometric pressure. After engine operating conditions are determined, routine 300 proceeds to 304.

At 304, the desired air mass flow rate is determined from the current engine speed and an operator torque request so that the engine outputs the desired engine power. The operator torque request may be determined from observing the position of an accelerator pedal, a lever, or from a signal produced by an external system (e.g., an analog or digital command from a hybrid vehicle controller). The torque request signal is transformed into a driver brake torque request by way of a two dimensional table that contains engine speed data verses accelerator pedal position. When queried, the table outputs a desired driver brake torque. The desired driver torque can be compared to the engine torque limit $T_{LIMIT}$ determined at 214 of FIG. 2. If $T_{LIMIT}$ is greater than the desired driver torque the desired driver brake torque is limited to $T_{LIMIT}$ otherwise the desired driver brake torque remains unaltered. The desired driver brake torque is summed with the torque used to operate accessories and an estimate of engine pumping torque to calculate a desired engine brake torque. This is illustrated by the following equation:

$$\Gamma_{eng\_brake\_tor} = \Gamma_{driver} + \Gamma_{ace} + \Gamma_{pump}$$

where $\Gamma_{eng\_brake\_tor}$ is the requested engine brake torque, $\Gamma_{driver}$ is the requested or desired driver torque demand, $\Gamma_{ace}$ is the torque to power accessories (e.g., an air conditioning compressor), and $\Gamma_{pump}$ is the engine pumping torque. The requested engine brake torque and current engine speed are then used to index a table that outputs an engine load. The engine load is converted to an air mass flow rate by the following equation:

$$des\_am = sarchg * N * \frac{Num\_cyl}{2} * Load$$

where des_am is the desired air mass flow rate of the engine, sarchg is the cylinder air charge capacity based on the cylinder volume at standard temperature and pressure, N is the engine speed, Num_cyl is the number of engine cylinders, and Load is a fractional number that represents an engine air capacity. The specific air charge in a cylinder can be determined by the equation:

$$Cyl\_air\_chg = Load * sarchg$$

The desired cylinder air charge can then be converted into an intake manifold pressure by using the known relationship between cylinder air charge and intake manifold pressure. Specifically, in some variable cam configurations, a nearly linear relationship exists between cylinder air charge and intake manifold pressure. A family of curves that are based on engine speed and cam positions can be stored that describe the relationship between cam positions, engine speed, cylinder air charge, and manifold pressure. These tables can be indexed by using the current engine speed, cam positions, and desired cylinder air charge to determine a desired intake manifold pressure. The desired intake manifold pressure is determined by interpolating between a limited number of empirical curves that describe cylinder air charge in relation to cam positions and intake manifold pressure. In other variable cam configurations, a quadratic relationship exists between intake manifold pressure and cylinder airflow. In these cases, it is possible to solve the roots of the equation and obtain an equation that outputs manifold pressure as a function of cylinder air charge at given cam positions. U.S. Pat. No. 7,380,447 describes the relationship between cylinder air charge and manifold pressure and is hereby fully incorporated by reference for all intents and purposes.

The desired manifold pressure may be achieved by setting the position of the throttle plate to match the desired cylinder airflow. Specifically, the throttle position may be set based on the desired pressure ratio across the throttle (e.g., the pressure ratio between desired manifold pressure and throttle inlet pressure) and a throttle angle that produces the desired engine air flow at the desired pressure ratio across the throttle. If desired, the throttle plate position can be adjusted further using a proportional/integral controller that moves the throttle plate based on feedback from a manifold pressure sensor.

In addition, if desired, engine spark timing can be adjusted when engine air amount is adjusted by simply accessing a table of spark values that correspond to the revised cylinder air charge. In one example, when the cylinder air amount is reduced the spark can be advanced.

At 306, the turbocharger waste gate position or vane position is set. Engine speed and desired engine load are used to index a table that outputs a desired waste gate position. The waste gate position can be further adjusted for a throttle inlet pressure error (i.e., the desired throttle inlet pressure minus the actual throttle inlet pressure) by adjusting the waste gate position in response to the throttle inlet pressure error. In one example, a proportional/integral controller can be used to make waste gate adjustments based on the throttle inlet pressure error. The routine continues to 308.

At 308, the open-loop camshaft positions or valve timings are determined. The camshafts may be intake and exhaust camshafts or simply a single intake or exhaust camshaft. Alternatively, valve lifts may be determined in this step in substantially the same manner, i.e., by indexing predetermined tables and/or functions. Engine speed and desired engine torque are used to index tables that output empirically predetermined cam positions or valve timings for each cylinder bank. In one embodiment, intake camshafts may be retarded when engine temperature is above a threshold amount so that cylinder air amount is reduced. In another embodiment, intake camshaft timing may be advanced when engine temperature is above a threshold amount so that cylinder air amount is reduced. Routine 300 then proceeds to 310.

At 310, the desired valve operational adjustments are output to actuators. In one example, the camshaft angular position with respect to crankshaft timing is converted into duty cycle signals that cause the cam actuators to advance or retard through the control of oil flow to the cam phase actuator. The camshaft phase angle controller may simply output commands that position the camshaft in an open loop manner, or the controller may utilize camshaft position feedback and a proportional/integral position controller. Valve lift amounts are similarly processed. In system configurations that utilize other types of variable valve actuators, electrically or hydraulically controlled actuators for example, timing or lift adjustment can be simply be made to revise the timing that driver circuitry actuates particular valve actuators. Routine 300 then proceeds to step 312.

At 312, the desired fuel mass charge is determined. The compensated cylinder air charge mass is multiplied by the desired air-fuel ratio to determine the desired fuel mass. Routine 300 exits after the fuel delivery has been updated.

Figure 4:
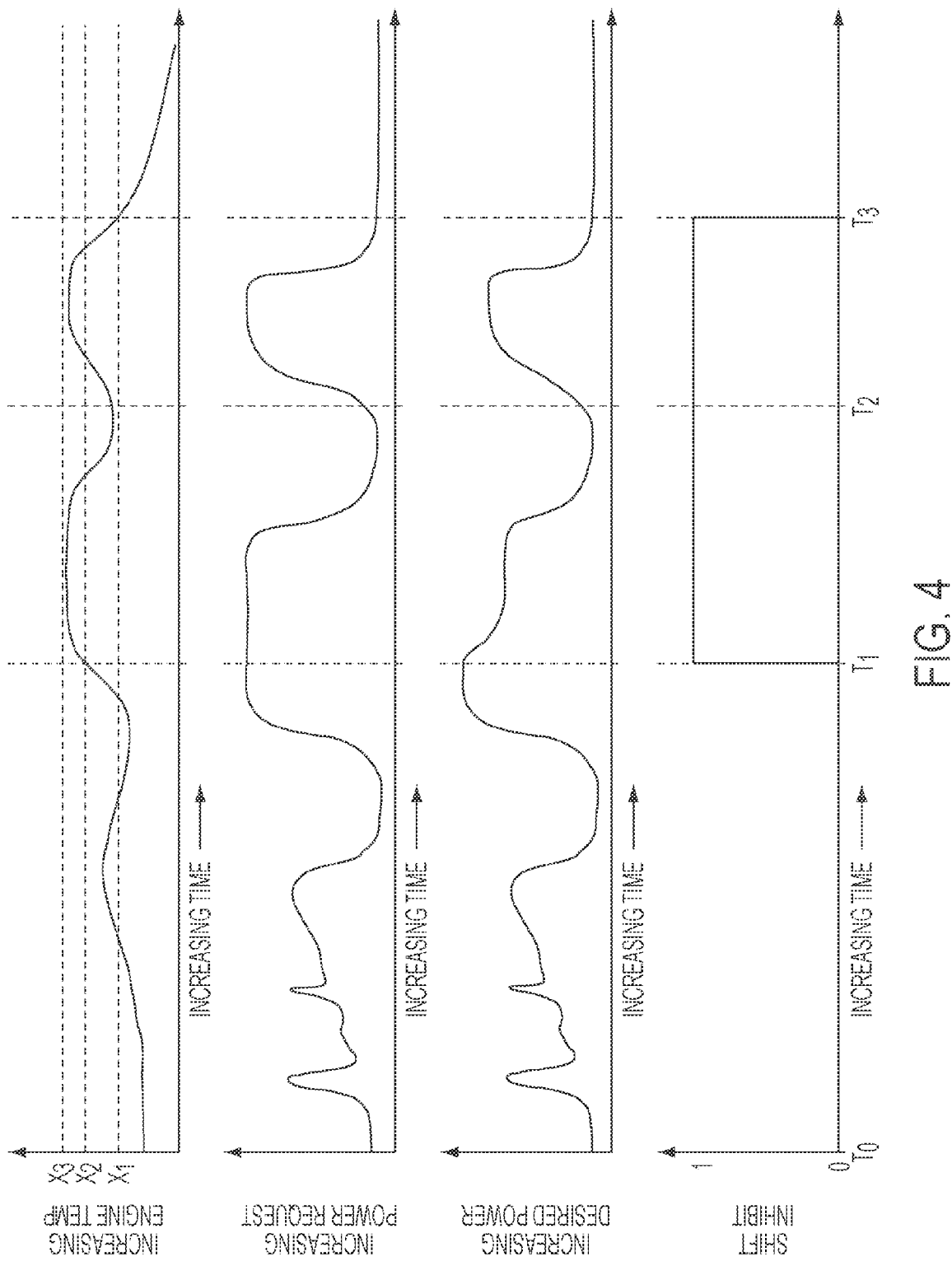
FIG. 4 shows a plot of example signals when the method of FIG. 2 is applied to an engine.

Referring now to FIG. 4, a plot of example signals when the method of FIG. 2 is applied to an engine to control engine temperature is shown. Each plot begins on the left hand side of the page and moves toward the right hand side of the page as time increases. The first plot from the top represents engine coolant temperature during the interval of interest. Engine temperature increases from the plot bottom to the plot top. The label $X_1$ and corresponding dashed line represent a hysteresis temperature, a temperature above which adjustment of engine power to control engine temperature remains active, once it is enabled, until engine temperature is less than the engine temperature. The label $X_2$ and corresponding dashed line represent an engine temperature at which engine temperature is controlled in response to a rate of engine temperature (e.g., $T_{ON}$ of FIG. 2). Label $X_3$ and corresponding dashed line represent an engine temperature that may be desirable not to exceed.

The second plot from the top of the page illustrates desired engine torque. Desired engine power may be provided by a controller or by way of a driver input from an accelerator pedal and engine speed. Desired engine power may follow a trajectory similar to the driver's demand torque modified of course with engine speed.

The third plot from the top of the page illustrates the engine power limited torque (e.g., $P_{LIMIT}$ of FIG. 2). Between $T_0$ and $T_1$, it can be seen that engine temperature does not reach a temperature that is sufficient to begin engine temperature control in response to a rate of engine temperature ($T_{ON}$). Therefore, there may be a one-to-one relationship between engine power limited power ($P_{LIMIT}$) and desired engine power (the second plot from the top of the page). Between $T_1$ and $T_2$, engine temperature increases above the temperature that is sufficient to begin engine temperature control in response to a rate of increasing engine temperature ($T_{ON}$). And more specifically, desired engine power first crosses the engine temperature that is sufficient to begin engine temperature control in response to a rate of increasing engine temperature ($T_{ON}$) at $T_1$. Between $T_1$ and $T_2$, desired engine power decreases and then increases prior to $T_2$. In this same interval, engine coolant temperature decreases below the engine temperature that is sufficient to begin engine temperature control in response to a rate of increasing engine temperature ($T_{ON}$), but engine temperature remains above the hysteresis temperature identified by $X_1$. Notice that engine limited power $P_{LIMIT}$ decreases as engine coolant temperature crosses the engine temperature that is sufficient to begin engine temperature control in response to a rate of increasing engine temperature ($T_{ON}$). Engine limited power decreases because engine temperature continues to increase during the same interval. Accordingly, the controller described in FIG. 2 causes engine power to be reduced so that engine temperature does not exceed a threshold level. As desired engine power continues to fall, engine limited power begins to once again track the desired engine power. However, at $T_2$ the desired engine power is increased and the engine limited power increases at a slower rate than between the $T_o$ and $T_1$ interval. In addition, the engine limited power is limited so that engine temperature may be reduced. When desired engine power is less than limited engine power, engine limited power follows close to desired engine power.

The fourth plot from the top of the page illustrates when transmission downshifting is deactivated for calculated resultant engine speeds in excess of a threshold engine speed. Transmission downshifting is deactivated when engine temperature exceeds an engine temperature that is sufficient to begin engine temperature control in response to a rate of increasing engine temperature ($T_{ON}$). Transmission downshift deactivation is designated by the signal going from a low level to high level. Transmission downshifting is reactivated when engine temperature exceeds an engine temperature that is less than the hysteresis temperature. Downshift deactivation is designated by the signal going from a high level to low level.

It will be appreciated that the configurations and routines disclosed herein are exemplary in nature, and that these specific embodiments are not to be considered in a limiting sense, because numerous variations are possible. For example, the above approaches can be applied to I-3, V-6, I-4, I-5, 1-6, V-8, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure. For example, one approach includes operating an engine such that a rate of temperature change of the engine is less than a first amount; and operating the engine such that said rate of temperature change of said engine is less than or equal to a second amount when an engine temperature exceeds a first threshold, with said second amount less than said first amount. However, the approach may include adjusting or limiting one of boost, throttle, cam timing, fuel flow, or another parameter in response to engine temperature exceeding a threshold.

The invention claimed is:

1. A method for controlling an engine, comprising:
when engine temperature is less than a first threshold, limiting an engine temperature rate of change to be less than a first amount; and
when said engine temperature exceeds the first threshold, limiting the engine temperature rate of change to be less than a second amount, said second amount less than said first amount.

2. The method of claim 1 wherein said limiting engine temperature rate of change includes reducing an amount of boost provided to said engine.

3. The method of claim 1 wherein said limiting engine temperature rate of change includes limiting a spark angle at which spark is supplied to at least one cylinder of said engine.

4. The method of claim 2 wherein said amount of boost is limited by a waste gate.

5. The method of claim 1 wherein said limiting engine temperature rate of change includes controlling a position of a throttle plate of said engine.

6. The method of claim 1 wherein said limiting engine temperature rate of change includes adjusting a type and quantity of fuel delivered to said engine.

7. A method for controlling an engine, comprising:
adjusting an engine control parameter such that a rate of temperature change of said engine is less that a first amount when a temperature of said engine is less than a first threshold temperature; and adjusting the engine control parameter such that said rate of temperature change of said engine is less than a second amount, said second amount less than said first amount, when a temperature of said engine is greater than a second threshold temperature.

8. The method of claim 7 wherein said control parameter is a desired amount of boost.

9. The method of claim 7 wherein said control parameter is a cylinder air amount.

10. The method of claim 7 wherein said control parameter is an angle of a camshaft relative to a position of a crankshaft.

11. The method of claim 7 further comprising varying said second amount with the temperature of said engine.

12. The method of claim 7 further comprising limiting shifting of a transmission when said temperature of said engine is greater than said second threshold temperature.

13. The method of claim 12 wherein said limiting inhibits said transmission from downshifting when a resultant speed of said engine exceeds a threshold.

14. The method of claim 7 further comprising enriching an air-fuel mixture of at least one cylinder of said engine when said temperature of said engine is greater than said second threshold temperature and engine load exceeds a threshold.

* * * * *